(No Model.) 3 Sheets—Sheet 1.

J. A. WIEDERSHEIM.
APPARATUS FOR FILTERING OR PURIFYING AND AERATING WATER.

No. 605,985. Patented June 21, 1898.

WITNESSES:
P. F. Eagle
L. Douville.

INVENTOR
John A. Wiedersheim

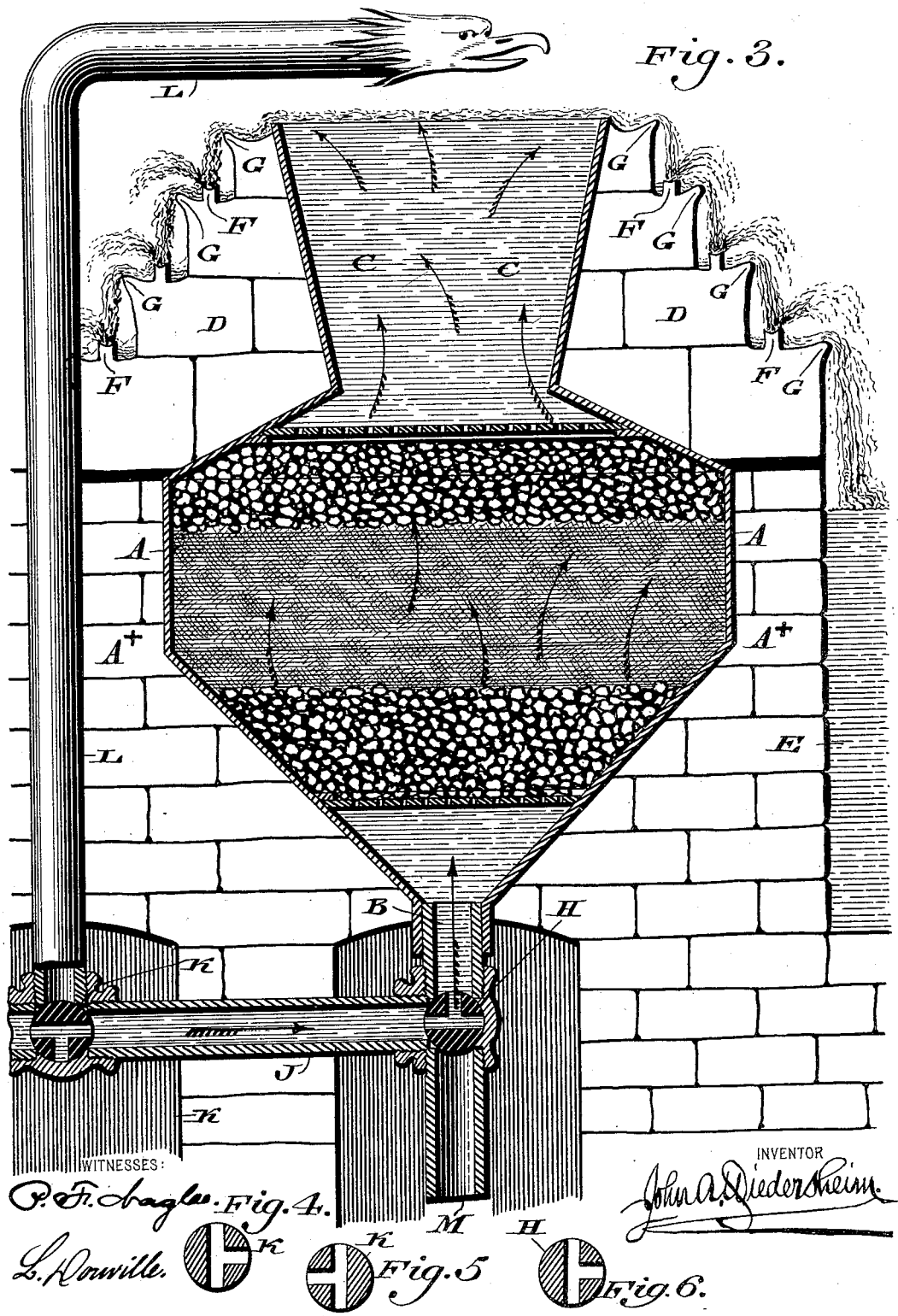

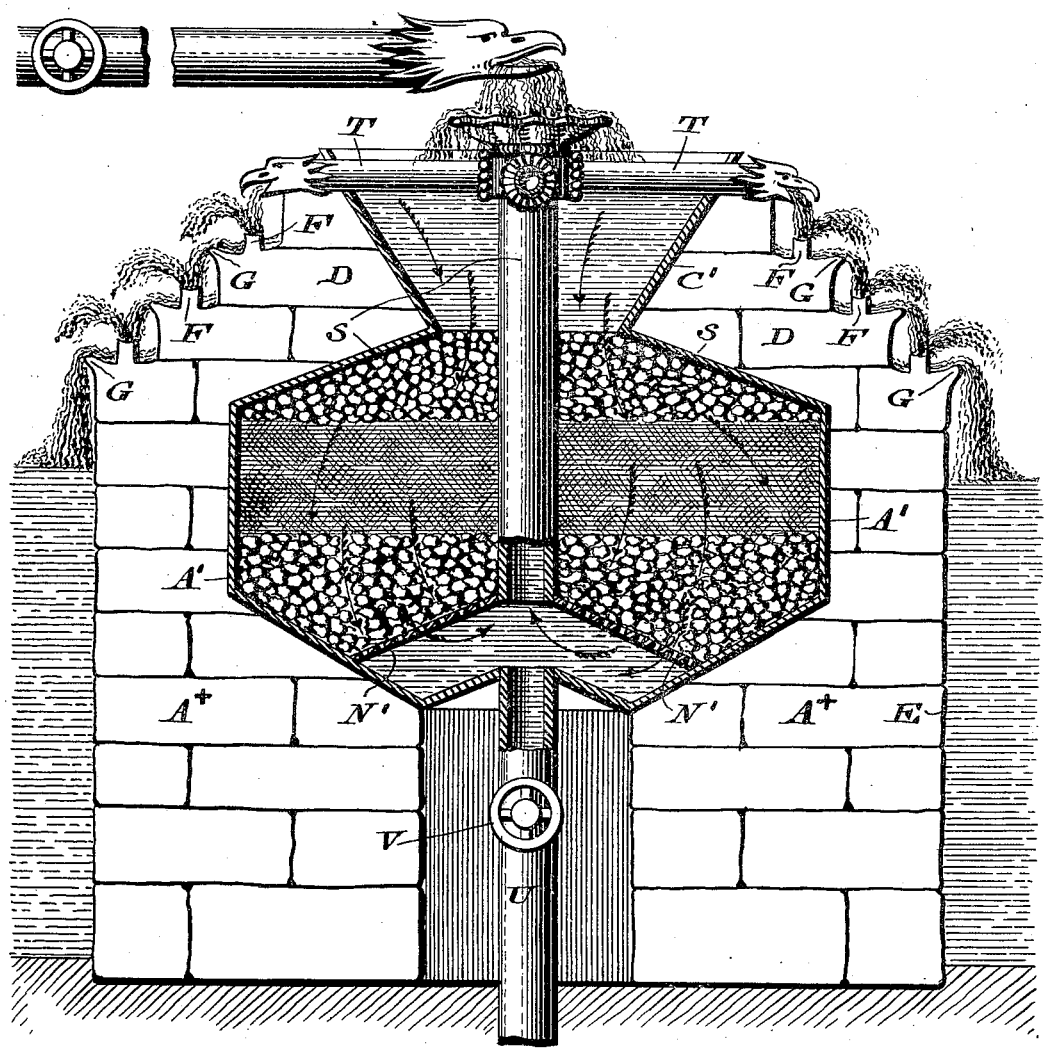

UNITED STATES PATENT OFFICE.

JOHN A. WIEDERSHEIM, OF PHILADELPHIA, PENNSYLVANIA.

APPARATUS FOR FILTERING OR PURIFYING AND AERATING WATER.

SPECIFICATION forming part of Letters Patent No. 605,985, dated June 21, 1898.

Application filed February 25, 1898. Serial No. 671,597. (No model.)

*To all whom it may concern:*

Be it known that I, JOHN A. WIEDERSHEIM, a citizen of the United States, residing in the city and county of Philadelphia, State of Pennsylvania, have invented a new and useful Improvement in an Apparatus for Filtering or Purifying and Aerating Water, which improvement is fully set forth in the following specification and accompanying drawings.

My invention consists of an apparatus for filtering or purifying and aerating water, involving means for passing unfiltered water through a material which filters or purifies or both filters and purifies the same, presenting the water as treated in running condition to the atmosphere, discharging it in running condition in downward direction exposed to the atmosphere, violently deflecting it upwardly and then dropping it and again discharging it in downward direction while exposed to the atmosphere, thus effectively aerating the same, and then directing it into a basin or receptacle, where it may be stored and exposed to the atmosphere, whereby it is in condition for drinking or industrial pursuits requiring such fluid pure and clear.

Figure 1:
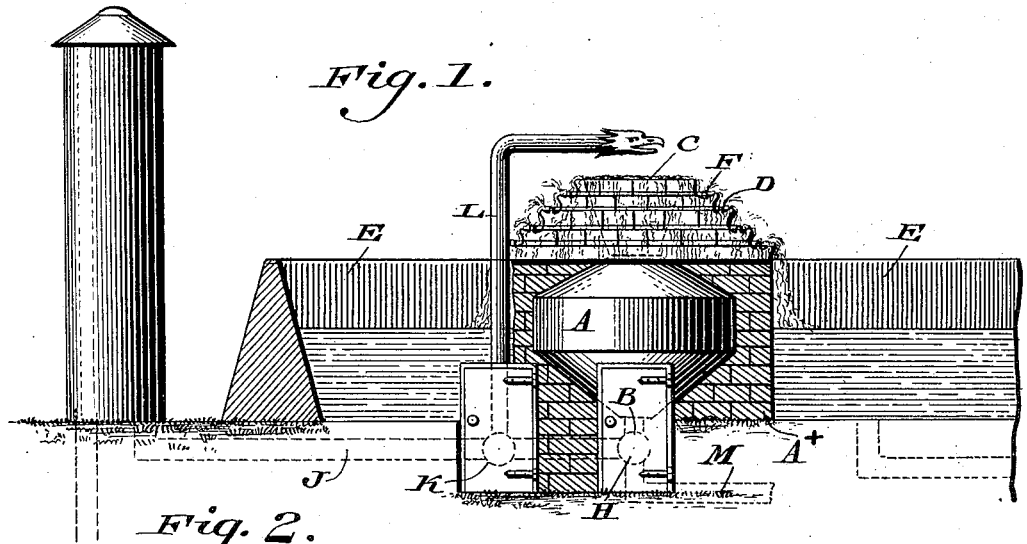
Figure 2:
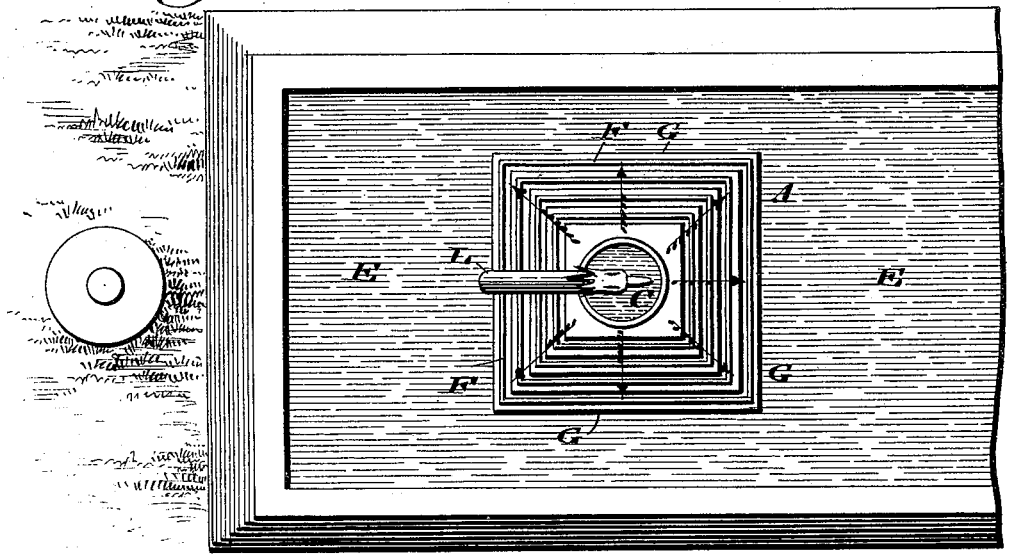
Figure 7:
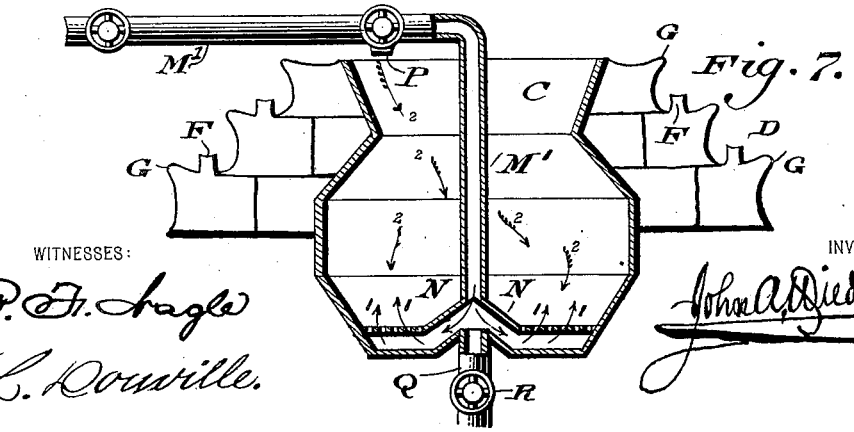

Figure 1 represents a side elevation of a water filter or purifier and aerating apparatus embodying my invention, including a vertical section of the adjacent portion of the plant. Fig. 2 represents a top or plan view thereof. Fig. 3 represents a vertical section of said apparatus on an enlarged scale. Figs. 4, 5, and 6 represent sections of different portions of cocks employed. Fig. 7 represents a vertical section of another form of apparatus embodying the invention. Fig. 8 represents a vertical section of another form of filter wherein water enters the casing from above and discharges into the same from below, but is in other respects similar to the general idea.

Similar letters of reference indicate corresponding parts in the figures.

Referring to the drawings, A designates a suitably-shaped body or casing having filtering material or purifying or both filtering and purifying material therein and provided with an inlet-pipe B, connected with the lower end thereof. As a purifying material I may use any coagulant, which may be placed in the filter-bed or suitable part of said casing. Rising from the casing A is the well C, which is in communication with the interior thereof and has its top open to the atmosphere.

The casing A is supported on and inclosed by masonry $A^\times$ or other suitable means, or the same may be formed of such masonry or of cement or other proper material.

D designates a wall around the well C, the same having a surface of terraces, steps, or the like beginning above at or near the top of said well and terminating below over the storage-basin E. On the horizontal faces or treads of the terraces or steps are vertically-extending splash-beds F, which are located near the risers of the terraces or steps, the noses G of said risers preferably jutting out or overhanging, as will be most clearly seen in Fig. 3.

The pipe B is provided with the two-way cock H and has connected with it the pipe J, the latter leading from the source of the water to be filtered or purified or both filtered and purified and having in it the two-way cock K, it being evident that when the cocks K and H are in the position shown in Fig. 3 the unfiltered water will pass through the pipes J and B and so enter the casing A. Connected with the pipe J at the cock K is the pipe L, which passes upwardly therefrom and has its top over the well C and opening into the same.

When the cock K is turned into the position shown in Fig. 4, the supply of water is cut off from the pipes J and L, and consequently from either end of the filter. When the cock is turned into the position shown in Fig. 5, the unfiltered water will be cut off from the filter-casing from below and be directed into the pipe L and from thence discharged into the well C, and consequently into the filter from above.

When the cock H is turned into the position shown in Fig. 6, the supply of unfiltered water to the filter ceases, and the latter may be drained of its contents and be directed by the pipe M into the river or a different place than the supply, or it may be discharged into the ground or elsewhere, as desired.

It will be seen that when the unfiltered water enters the casing A it passes upwardly through the material or bed therein and is subjected to the action of the latter, and from thence the water enters the well C in filtered or purified or both filtered and purified condition as a primary place of collection of the same and rises to the top of said well, where it is successively presented to the atmosphere while in running condition, and then primarily overflows and is directed over the upper terrace or step, exposed to the atmosphere, from whence it also overflows and overturns and then drops and splashes upon the bed F and is thus violently thrown or deflected upwardly, after which it falls and again overflows the adjacent terrace or step and splashes, all while exposed to the atmosphere, the operation of overflowing and splashing of the water and the upward and downward deflection thereof while in the atmosphere continuing through the series of terraces or steps and beds, whereby the filtered or purified or both filtered and purified water is agitated and separated to such extent as to be effectively aerated, in which condition it enters the open storage-basin E, from whence it may be drawn off or directed into the mains, as desired, or subjected to further filtration or purification or both filtration and purification by being directed through another plant similar to that hereinbefore set forth.

Should it be desired to clean the filter or freshen the filtering or purifying material or bed therein, the cock H is turned to the position shown in Fig. 6 and the cock K is turned to the position shown in Fig. 5. The water in the filter and that in the well will now drain through the casing A, and the filth, accumulation, or deposits in said material or bed will pass through the pipes B and M and so be directed elsewhere simultaneously therewith; but unfiltered water flows into the pipe L and is directed by the same to the well C, into which it is discharged, and the same passes through the casing A and the material or bed therein, loosening the latter, when the filth, accumulation, or deposits will be washed out and be directed into the pipes B and M.

Should it be desired simply to drain the filter, the cock H will be turned to the position shown in Fig. 4, thus shutting off the supply of unfiltered water. The cock H is turned to the position shown in Fig. 6, when the water in the casing will flow into the pipes B and M.

When filtering is again required, the cocks K and H are turned to the positions shown in Fig. 3, when the unfiltered water will flow through the pipes J and B and so enter the casing A, when the operation of filtering or purifying, exposing to the atmosphere, and aerating will be repeated and continued as long as desired.

In Fig. 7 the casing is supplied with unfiltered water, admitted into the same at the bottom thereof by the supply-pipe M', which enters the casing from above, the base of said pipe having a deflector N for properly distributing the water into the casing. The pipe M is provided with a cock P, and the base of the casing has a discharge-pipe Q and cock R, whereby by properly opening said cocks unfiltered water may be directed into the well and wash the impurities, &c., in the casing and filtering material into the discharge-pipe Q.

The number of wells may be increased for each basin or storage-place, and the shape of the well C may be angular, circular, &c.

In Fig. 8 the unfiltered water is directed into the well C' and enters the casing A', whose filtering or purifying material is supported on the perforated diaphragm N' near the bottom of said casing. Connected with the center of said diaphragm is the discharge-pipe S, which rises therefrom through the casing to the top of the same when it has the branch discharge-pipes T, the latter having their outlet ends open to the atmosphere above the upper splash-beds F. In this construction the water is filtered or purified, is directed to the bottom of the casing, rises as treated through the pipe S, and enters the pipes T, from whence it escapes to be subjected to agitation and aeration, as in the other cases. The receiving-well is supplied with unfiltered water from the pipe L, which leads from a source of supply, which in any case may be a running stream, a basin, pumping-station, stand-pipe, &c. The casing A' is provided with an outlet-pipe U, having a cock or valve V, which when closed causes the water to rise in the pipe S, but which when opened allows the unfiltered water and the impurities, &c., in the casing to escape from the latter and be directed elsewhere.

It is evident that fluids other than water may be treated in the above manner when it is desired to filter or purify or both filter and purify or aerate the same.

It will be noticed that the support $A^\times$ of the casing of the filter or purifier rises from the storage-bed and the well C is elevated by said casing, so as to increase the fall of the filtered or purified water in its passage to the storage-basin.

The wall D is sustained on the casing-support $A^\times$ as an upward continuation of the same, avoiding separate sustaining means for said parts and enabling said support and wall to form a strong structure.

Furthermore, the well is entirely inclosed by the terraced wall D, and the base of the latter is surrounded by the storage-basin, so that the course of the filtered or purified water leaving the top of the well is diverted in various directions therefrom in its descent from said well down the surrounding wall as a slope and reaches said basin in numerous streams, as will be most clearly shown in Fig. 2, thus increasing the aerating action on the water.

Having thus described my invention, what I claim as new, and desire to secure by Letters Patent, is—

1. A casing containing filtering or purifying material or both such materials, a supply-pipe leading thereinto from below, a well above said material communicating with said casing, and an auxiliary supply-pipe leading to said well above the same, the top of said well being open to the atmosphere.

2. A casing containing filtering or purifying material or both such materials, a well above said material or materials communicating with said casing, a supply-pipe for said casing, provided with a two-way cock, a supplemental supply-pipe leading from said cock to the top of said well, a two-way cock interposed between the first-named cock and the bottom of said casing, and a discharge-pipe connected with the second-named cock.

3. A casing containing filtering or purifying material or both such materials, a well on the casing above said material or materials, a supply-pipe connected with a casing below said material or materials, a terrace around said well and a splash-bed on said terrace.

4. In an apparatus for filtering or purifying or both filtering and purifying water, a well for receiving the filtered or purified water, and discharging it in running condition therefrom, a terrace around said bed, and a splash-bed on said terrace.

5. In an apparatus for filtering or purifying or both filtering and purifying water, a casing with a filter or purifying bed therein, a main supply-pipe connected with the bottom of said casing below said bed, a well above said bed communicating with said casing, an auxiliary supply-pipe connected with said main supply-pipe, a two-way cock connected with said pipes, a discharge-pipe connected with the main supply-pipe, a two-way cock connected with the main supply and discharge pipes, and a terrace around said well, the auxiliary supply-pipe having its discharge end above said well.

6. In a filter and purifying apparatus adapted to discharge the filtered or purified water or fluid above the filtering or purifying bed through a well or reservoir, and in running condition from the latter, a terrace around said well, and a splash-bed on said terrace.

7. In a filter, a casing, a well thereover, a terrace around said well, a supply-pipe leading to the bottom of said casing, the top of said well forming an overflow for filtered or purified water or both adjacent to the top of said terrace and a discharge for unfiltered water and deposits leading from the bottom of said casing, said terrace being above a storage-basin, into which said water, as filtered or purified or both filtered and purified water is discharged.

8. A storage-basin, a filter or purifying device, a well above said device in communication therewith, a terraced wall surrounding said well and means for directing water in opposite directions into said device.

9. A storage-basin, a filter or purifying device, a well above said device in communication therewith, a terraced wall surrounding said well and means for directing water into said device, said terraced wall being sustained on the support of said filtering or purifying device, and forming an upward continuation thereof.

10. A storage-basin, a filtering or purifying device, a well above said device in communication therewith, and an elevated wall around said well and sloping from the top of said well toward said basin, the latter containing said filtering or purifying device and surrounding said well.

JOHN A. WIEDERSHEIM.

Witnesses:
M. G. LUKENS,
C. D. McVAY.